(No Model.)
C. SCHOENLEBER.
BILLIARD CUE TRIMMER AND TIP FASTENER.
No. 589,225. Patented Aug. 31, 1897.
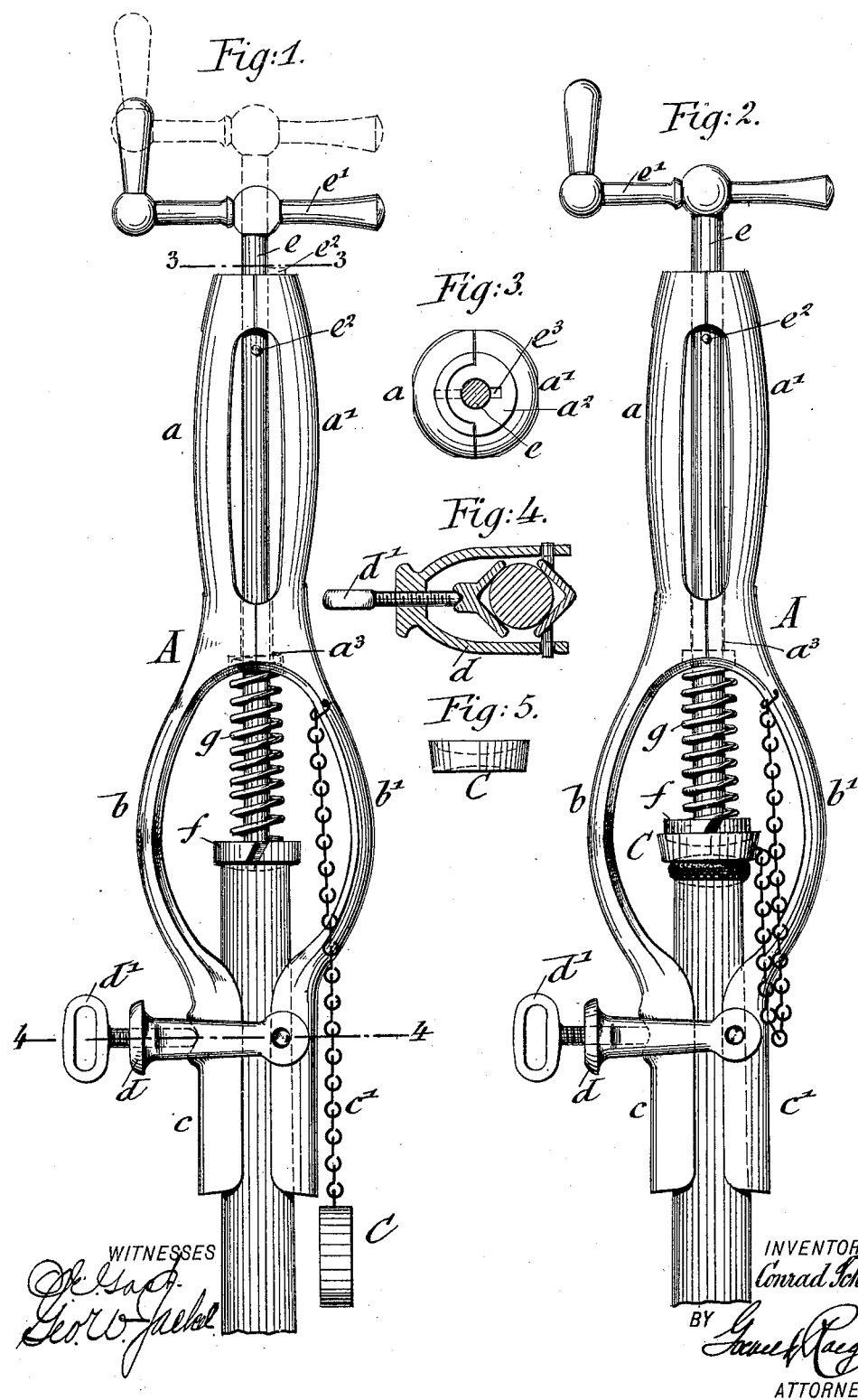

UNITED STATES PATENT OFFICE.

CONRAD SCHOENLEBER, OF BRIDGEPORT, CONNECTICUT.

BILLIARD-CUE TRIMMER AND TIP-FASTENER.

SPECIFICATION forming part of Letters Patent No. 589,225, dated August 31, 1897.

Application filed February 23, 1897. Serial No. 624,543. (No model.)

*To all whom it may concern:*

Be it known that I, CONRAD SCHOENLEBER, a citizen of the United States, residing at Bridgeport, in the county of Fairfield and State of Connecticut, have invented certain new and useful Improvements in Billiard-Cue Trimmers and Tip-Fasteners, of which the following is a specification.

This invention relates to billiard-cue trimmers and tip-fasteners, and has for its object to produce a strong, compact, and effective implement for trimming the ends of billiard-cues and fastening the tips thereon.

My invention consists of the implement having a pair of jaws for holding the end of the cue and a trimming-tool adapted to be pressed against the end of said cue and means for rotating said tool.

The invention consists, further, of the details of construction hereinafter described, and specified in the claims.

Referring to the drawings, Figure 1 is a plan view of the implement when applied to a cue and showing in dotted lines the trimmer withdrawn. Fig. 2 is a plan view showing the method of fastening the tip on the cue. Fig. 3 is a cross-section on line 3 3 of Fig. 1. Fig. 4 is a cross-section on line 4 4 of Fig. 1. Fig. 5 is a detail view of the cap.

Similar letters of reference indicate corresponding parts.

The improved implement A is preferably of cast-steel and is made in two halves suitably secured together and comprises two upper portions $a$ $a'$, two central portions $b$ $b'$, and two lower portions $c$ $c'$. The upper portions $a$ $a'$ are matched together, as shown in Fig. 3, and secured by rivets, forming a ledge $a^2$ at the upper extremity of the upper portion and a similar ledge $a^3$ between the upper and middle portions. Between these two ledges the upper portions are hollow, and when secured together form the handle of the implement. The two central portions $b$ $b'$ are narrowed and curved outwardly away from each other, forming a working space for the convenient manipulation of the cue. The two lower portions $c$ $c'$ are widened and shaped into angular clamping-jaws, which are adapted to grasp the end of a billiard-cue.

Loosely pivoted to one of the jaws $c'$ is a swinging yoke $d$, which embraces the second jaw $c$. A binding-screw $d'$ is threaded through the end of said yoke and impinges against a projection on the jaw $c$. By this means the jaws can be forcibly clamped upon the end of a cue and hold the end of said cue firmly against the trimming-tool. A rod $e$ is revolubly journaled in the ledges $a^2$ $a^3$ of the handle $a$ and is provided with a suitable handle $e'$ at the outer end thereof. A trimming-tool or reaming-cutter $f$ is secured upon the end of said rod $e$. A helical spring $g$ is sleeved upon the rod $e$ and abuts against the ledge $a^3$ and the under side of the trimming-tool $f$. By this means the trimming-tool is forcibly held against the end of the cue. The rod $e$ is provided with a small pin $e^2$ near the handle $e'$, which is adapted to pass through a small groove $e^3$, formed in the bore of the handle, through which the rod $e$ passes. The rod $e$, and with it the trimming-tool $f$, may be pulled back against the tension of the spring $g$. The pin $e^2$ passes through the groove $e^3$. The rod is then turned and the pin rests upon the ledge $a^2$ at the end of the handle, thus retaining the rod in its withdrawn position, as shown in dotted lines in Fig. 1.

A small cap C is attached to one of the arms by a suitable chain. The cap C is suitably hollowed out to fit over the trimmer and is slightly concaved upon its upper surface to receive the tip.

The end of a billiard-cue to be trimmed is inserted between the jaws of the implement and securely clamped therein against the cutting-face of the trimming-tool, which is preferably forced back against the tension of the spring $f$. The trimming-tool is then operated by rotating the rod by means of its handle, the spring pressing the trimming-tool up against the end of the cue during the operation. The end of the cue is thus smoothly trimmed and slightly concaved, so as to receive the cement or other adhesive by which the tip is secured in place. When the cue is suitably trimmed, the trimming-tool is withdrawn and retained in its withdrawn position by means of the pin $c^2$, as before explained. The adhesive is then applied to the cue and the tip applied. The cap C is then placed over the trimming-tool and the rod is released, and the said cap is pressed firmly against the tip, thus holding it secured in place until the adhesive dries sufficiently to hold said tip. The implement may then be removed and is ready for operation upon another cue.

Having thus described my invention, I claim as new and desire to secure by Letters Patent—

1. An implement for trimming billiard-cues, comprising a hollow handle, holding-jaws, clamping means for locking said jaws, a spring-pressed rod journaled in said hollow handle, a suitable trimming-tool carried by said rod, a handle whereby the spring-pressed rod may be rotated and partially withdrawn, and means for locking the said rod in its withdrawn position, substantially as set forth.

2. An implement for trimming billiard-cues, comprising a hollow handle provided with a groove in its upper portion, holding-jaws, clamping means for locking said jaws, a spring-pressed rod rotatably journaled in said handle portion, a ledge at the upper end of said hollow handle, a pin attached to said rod and adapted to pass through the said groove and to bear upon said edge, and a suitable trimming-tool carried by said rod, substantially as set forth.

3. In an implement for trimming billiard-cues, the combination with an upper handle portion, clamping-jaws, a spring-pressed rod rotatably journaled in said handle portion, a suitable trimming-tool secured to said rod, and means whereby said trimming-tool may be withdrawn and locked in its withdrawn position, of a cap hollowed out on one side to fit over the top of the trimming-tool and concave on the other side, substantially as set forth.

In testimony that I claim the foregoing as my invention I have signed my name in presence of two subscribing witnesses.

CONRAD SCHOENLEBER.

Witnesses:
M. J. BUECHLER,
D. SCHVEITZER.